March 24, 1931. J. MAGIN 1,797,615
SUPPORTING COLLAR FOR BORING BAR BLADES
Filed Aug. 27, 1927
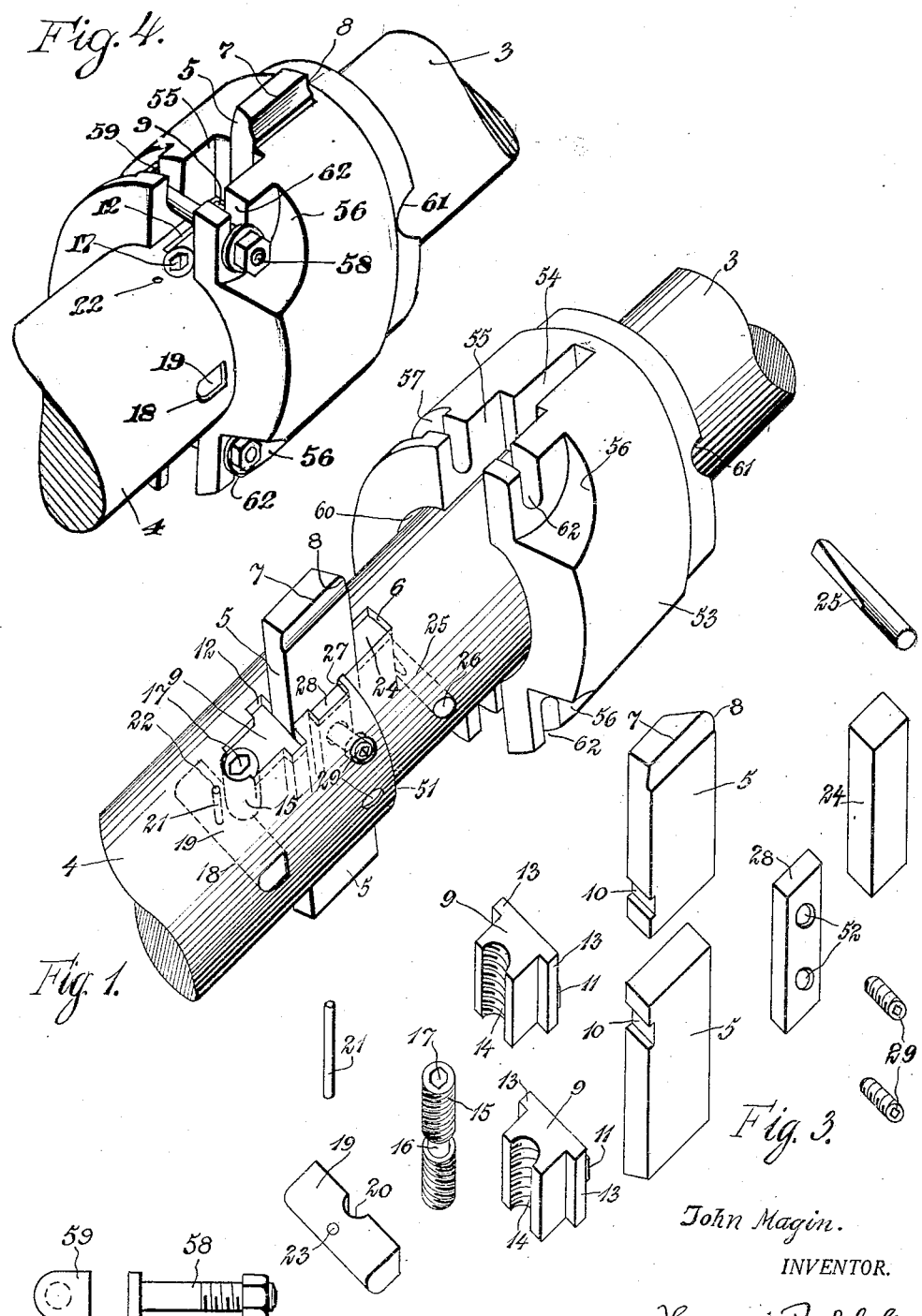
John Magin.
INVENTOR.
BY Hoar & Ruhloff
ATTORNEYS.

Patented Mar. 24, 1931

1,797,615

UNITED STATES PATENT OFFICE

JOHN MAGIN, OF SOUTH MILWAUKEE, WISCONSIN

SUPPORTING COLLAR FOR BORING-BAR BLADES

Application filed August 27, 1927. Serial No. 215,866.

My invention relates to new and useful improvements in tool supports for boring bars, and, in particular, is an improvement over the invention disclosed and claimed in my copending Patent No. 1,659,370, dated February 14, 1928.

The chief defect of all methods of supporting the cutting tools in a boring bar, that were in use prior to the invention of my improved boring bar as disclosed in said patent, has been the impossibility of rigidly adjusting the cutting tools to anything more than a very limited range of size of cut. If adjusted to a size beyond that range, the cutters lacked proper support, and in consequence they were likely to chatter, causing a bad cut and materially increasing the wear of the cutter, and even frequently breaking both cutter and bar.

The usual method of remedying this defect had formerly been to provide a relatively large number of bars, in various sizes, each bar to be used only for a limited range of size of cut. This entails a considerable loss of time in changing and readjusting, besides the original outlay for the bars.

In my above-mentioned patent I have shown and described an improved form of boring bar which provides a very rigid, easily adjustable support for the cutting tool, that is of simple and rugged construction and contains relatively few parts. This improvement allows the use of the same bar for a considerably increased range of cut.

The chief object of this present invention is to provide a still wider range of possibility of cut without necessitating change of bars.

Another object of my invention is to provide a tool support for a boring bar, wherein, although the cutters can be adjusted to a very considerable range of cut, they are still supported with very great rigidity, so that no chattering can occur.

A further object is to provide a tool support which, at the same time as it allows of a very wide range of adjustment, will also be adjustable with great precision and can then be locked against any movement; the locking mechanism being such that it is not easily displaced, and furthermore serves to lock the cutter without any strain being put upon the adjusting mechanism.

These objects I accomplish by the addition to the device shown and described in my said patent of very few additional parts. These parts consist solely of a collar or sleeve, to furnish additional rigid support to the cutting tools, with the means of attaching said collar.

Other advantages of the simple design of my tool support will naturally suggest themselves as the description of the device progresses.

The invention consists in the novel parts and in the combinations and arrangements defined in the appended claims, and of which one embodiment is exemplified in the accompanying drawings, which are hereinafter described and explained.

Throughout, the same reference number is applied to the same member or to similar members: and for convenience of reference to my said copending Patent No. 1,659,370, each member which is described in said patent is herein designated by the same number as was used in said patent, all such numbers being less than 30; while the members herein for the first time described are designated by numbers greater than 50.

In the appended drawings, Figure 1 is a perspective view of one form of my invention, with all the parts enumerated and described in my said copending patent shown in place, and with the cutter-supporting collar which is more particularly the subject of the present application, slipped along upon the front portion of the boring bar, in order the better to exhibit the construction.

Figure 2 shows the bolt which I use to clamp the collar upon the bar and the cutters.

Under the general designation, Figure 3, there are shown, separately, in perspective, all the individual parts which, in Figure 1, are shown inserted in place in the bar. The positions of these individual parts in Figure 3 exhibit, as far as possible, their relative positions and interactions in the assemblage shown in Figure 1, Figure 4 is a perspective view of the showing of Figure 1, but with the collar clamped in its operative position.

Referring to the drawings, it will be seen that 3 represents the forward portion and 4 the rear portion of the boring bar proper, the rear portion being of slightly larger diameter than the forward portion, the place of demarcation being the shoulder 51.

A pair of cutters 5 is adjustably positioned in a slot 6 in the bar, each of which pair has its outer edge 7 and its forward edge 8 bevelled for cutting when pressed against an object which is being rotated. Each cutter has a recess 10 for a purpose to be described.

The slot 6 also carries a pair of chuck-nuts 9, which are keyed into recesses 10 of the cutters 5, by means of integral projections or keys 11. Each chuck-nut 9 is T-shaped for insertion into a similar T-shaped recess 12 in the rear portion 4 of the bar, in which recess the chuck-nuts are slidable, carrying with them the cutters 5. The chuck-nuts are provided with threaded semicylindrical grooves 14, the thread of one nut being right-handed and that of the other being left-handed.

The slot 6 also carries an adjusting screw 15, which has a narrowed neck 16 at its middle portion, and has its two ends oppositely threaded so as to engage the correspondingly threaded portions of the two chuck-nuts 9. One end of the adjusting screw 15 has a polygonal socket 17 for the insertion of a socket wrench. The turning of the screw thrust out or draws in the chuck nuts 9, and therefore, by means of the projections 11 and recesses 10, the cutters 5.

To the rear of slot 6, and at right angles to it and partly cutting it, is a slot 18, carrying a lock-plate 19. This plate has a semicylindrical recess 20 to engage the neck 16 of the adjusting screw 15, thereby constraining the screw against any longitudinal motion. The lock-plate 19 is held in place by a pin 21, which passes through a hole 22 in the bar and a corresponding hole 23 in the plate.

The slot 6 carries, forward of the cutters 5, a clamping key, 24, which can be clamped against the front face of the cutters 5 by driving the pin 25, which has a flat-tapered side, into a hole 26 of the bar 3, the pin then passing forward of and bearing against the key 24.

The reason for the T-shape of the chuck-nuts 9 is now evident. The side projections 13, besides acting as slides, also serve to prevent the pressure due to inserting the clamping key 24 and the clamping pin 25 from being transmitted to the screw 15.

The slot 6 also has a lateral recess 27 which carries a clamping plate 28, which can be clamped against one lateral face of the cutters 5, by means of the set screws 29, which have socket heads. The clamping plate 28 is counterbored at 52 for the points of the set screws 29, in order to constrain the plate against motion longitudinal of the recess 27.

The foregoing portion of the description pertains equally to my above-mentioned patent. To this construction the present application adds the follow new matter.

Figure 1 shows, displaced forwardly along the bar from its operative position, a cylindrical collar or sleeve 53, which has a tool slot 54 milled diametrically through it, and rearward of this tool-slot a wider slot 55 for operating adjustments of the cutters 5. Opposite this latter slot 55 the collar 53 is provided with four counterbores 56, 57. These counterbores are for the purpose of providing seats for the heads and nuts of two bolts, one bolt being shown at 58, which serves to clamp the collar upon the tool and the bar. These bolts have U-shaped heads, 59, and the counterbores 57 on one side of the slot 55 are similarly U-shaped, to prevent rotation of the bolt head when the nut is tightened. The collar is slotted as shown at 62 for the easy insertion of bolts 58.

The collar is counterbored at its rearward end, as shown at 60, to a diameter large enough to fit snugly over the rearward portion 4 of the boring bar, its forward end fitting snugly over the forward portion 3 of the bar. There is therefore a shoulder (not shown) in the interior cylindrical surface of the collar, which abuts the shoulder 51 at the junction of the parts 3 and 4 of the bar.

The forward face of the collar has milled therein a semicircular groove 61, to allow insertion or removal of the pin 25 without displacing the collar from its operative position.

Although from the foregoing description the method of using my invention will be evident to any one skilled in the art, I shall describe the method of assembling my device starting from a completely disassembled condition, with all detachable parts removed.

First the lock-plate 19 is inserted and fastened in place by insertion of the pin 21 into the hole 22 in the bar and also into the hole 23 in the lock-plate 19.

Then the adjusting screw 15 is put into place, its narrowed neck 16 engaging the semicylindrical recess 20 in lock-plate 19.

Next the two chuck-nuts 9 are brought up to the ends of the screw 15, so that the threads just begin to engage. A socket wrench is inserted in the polygonal socket 17 at one end of screw 15, and turned to bring the chuck-nuts 9 into position within the bar.

The lateral clamping plate 28 is then inserted in its recess 27, being temporarily supported in its place by any small bar, such as the clamping key 24, loosely inserted into the place later to be occupied by one of the cutters 5.

One of the cutters 5 is then inserted, its recess 10 being fitted to the projection 11 on the corresponding chuck-nut 9. The loosely inserted support of the lateral clamping plate 28 is next removed, and the other cutter 5 inserted, its recess 10 being fitted to the projection 11 on the second chuck-nut 9.

Next the clamping key 24 is inserted in its proper place. Pin 25 is inserted loosely, and is tapped into such a position that it does not yet bind the key 24 to the cutters 5.

The socket wrench is next inserted in the polygonal socket 17 on one end of the adjusting screw 15, and brings the cutters 5 to the correct setting.

Then the pin 25 is tightened against the key 24.

Set screws 29 are next inserted, with their points set in the counterbores 52 of the clamping plate 28, and tightened to press the clamping plate against the cutters.

To substitute another set of cutters the procedure is as follows:

Unclamp the set screws 29. Knock out pin 25. Remove the clamping key 24. Remove one of the cutters 5, leaving the other to hold the lateral clamping plate 28 in place. Insert one of the new cutters; then remove the other old cutter and replace it by the other new cutter. Replace the clamping key 24. Replace pin 25 without tapping it entirely home. Adjust the cutters. Drive pin 25 home. Tighten the set screws 29.

The foregoing is the method of using the bar without using the collar 53, in cases where the diameter to be bored is not much greater than twice the diameter of the bar. When the collar is used for a cut of still greater diameter, the set screws 29 are not tightened down, as the collar itself clamps the cutting tool and the bar sufficiently rigidly without requiring the use of these set screws. The only occasion when it becomes necessary to remove the collar is when the cutters are removed for the substitution of another pair, as it is possible to get at all the other adjustments while the collar is in place.

All the other parts except the collar and the bolts being supposed in place but not tightened up, the collar is slipped over the end of the bar, and brought to a snug fit with the counterbored portion 60 fitted over the rear end 4 of the bar, so that the cutters 5 are in their proper position in the tool slot 54. The cutters 5 are then adjusted by applying a socket wrench to the socket 17 on the end of the screw 15. Then the pin 25 is driven home in the hole 26, which is accessible through the semicylindrical groove 61. The bolts are inserted in slots 62, with their U-shaped heads in counterbores, 57 and the nuts in counterbores 56. The nuts are then tightened.

To change the size of the cut without changing cutters, all that is necessary, provided the set screws 29 have been left untightened, is the following: Loosen the bolts 58; release the clamping pin 25. Then, with socket wrench, adjust the cutters 5 by means of screw 15. Reinsert the clamping pin 25, and tighten the bolts.

From the foregoing description, it is obvious that I have provided a tool support of simple design, that allows of an extremely large range in the size of cut without changes of bars; that my invention is possessed of great rigidity without putting any strain on the adjusting mechanism; and furthermore that adjustment of my device is at the same time extremely easy and capable of great accuracy.

Having thus described one form of my improved tool support, I wish it to be understood that my invention is not to be limited to any specific form or arrangement of parts, except in so far as such limitations are specified in the appended claims.

I claim:

1. In a device for permitting the use of extra-long blades in a boring-bar, the combination of: a collar, freely slidable on the shaft of the boring-bar and removable therefrom, and characterized by the fact that it contains, with respect to each blade of the boring-bar, a slot of cross-section barely larger than the cross-section of the blade, each such slot having a prolongation, in the walls of which prolongation are cut passageways for clamping-bolts, said walls possessing exterior abutments for the heads and nuts of such bolts; and clamping-bolts for said collar, whereby to clamp the collar simultaneously to the shaft and to the blades of the boring-bar.

2. In a device for permitting the use of extra-long blades in a boring-bar, the combination of: a collar, freely slidable on the shaft of the boring-bar and removable therefrom, and characterized by the fact that it contains, with respect to each blade of the boring-bar, a slot of cross-section barely larger than the cross-section of the blade, each such slot having a prolongation, in the walls of which prolongation are cut passageways for clamping-bolts, said walls possessing exterior abutments for the heads and nuts of such bolts, said collar being also recessed to expose all the adjustable controls of the boring-bar, so that the blades thereof can be adjusted without removing the collar; and clamping-bolts for said collar, whereby to clamp the collar simultaneously to the shaft and to the blades of the boring-bar.

3. In a device for permitting the use of extra-long blades in a boring-bar, the combination of: a collar, said collar being characterized by the fact that it contains a central hole, of the same shape as, and barely larger than, the shaft of the boring-bar; said collar being further characterized by the fact that it contains, with respect to each blade of the boring-bar, a rectangular slot of cross-section barely larger than the cross-section of the blade this slot being so positioned and constructed that a closing of the slot about the blade, thereby closes the collar itself clampingly about the shaft; said collar being still further characterized by the fact that it possesses pairs of abutments ᶜor clamping means, each pair straddling one of the slots; and appropriate clamping means, associated with each pair of abutments.

4. In a device for permitting the use of extra-long blades in a boring-bar, the combination of: a collar, said collar being characterized by the fact that it contains a central hole, of the same shape as, and barely larger than, the shaft of the boring-bar; said collar being further characterized by the fact that it contains, with respect to each blade of the boring-bar, a rectangular slot of cross-section barely larger than the cross-section of the blade this slot being so positioned and constructed that a closing of the slot about the blade, thereby closes the collar itself clampingly about the shaft; and a plurality of clamping means, disposed tangentially with respect to the collar, to contract each slot upon the sides of its blade, and thereby contract the central hole of the collar upon the bar.

In testimony whereof I affix my signature.

JOHN MAGIN.